(12) United States Patent
Pani et al.

(10) Patent No.: US 9,716,657 B1
(45) Date of Patent: Jul. 25, 2017

(54) TCP CONNECTION RESILIENCY IN MULTIPATH NETWORKS

(71) Applicant: Google Inc., Mountain View, CA (US)

(72) Inventors: Ayaskant Pani, Freemont, CA (US); Shashidhar Rao Gandham, Fremont, CA (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 14/039,916

(22) Filed: Sep. 27, 2013

(51) Int. Cl.
*H04L 12/803* (2013.01)

(52) U.S. Cl.
CPC .................................. *H04L 47/122* (2013.01)

(58) Field of Classification Search
CPC .......................................................... H04L 1/00
See application file for complete search history.

(56) References Cited

U.S. PATENT DOCUMENTS

| | | | |
|---|---|---|---|
| 7,978,731 B2 | 7/2011 | Accapadi et al. | |
| 8,400,923 B2 | 3/2013 | Kini | |
| 8,817,797 B2 | 8/2014 | Hampel | |
| 2004/0230660 A1* | 11/2004 | Abjanic et al. | 709/207 |
| 2005/0180429 A1* | 8/2005 | Ghahremani | H04L 12/5695 370/395.21 |
| 2006/0098662 A1* | 5/2006 | Gupta et al. | 370/401 |
| 2008/0159165 A1* | 7/2008 | Takara | 370/252 |
| 2010/0290464 A1* | 11/2010 | Assarpour | 370/390 |
| 2011/0040851 A1* | 2/2011 | Foisy | 709/218 |
| 2011/0075663 A1* | 3/2011 | Serbest | 370/390 |
| 2012/0155254 A1* | 6/2012 | Hinosugi | H04L 49/557 370/228 |
| 2014/0129671 A1 | 5/2014 | Baldwin | |

* cited by examiner

Primary Examiner — Robert M Morlan
Assistant Examiner — Nourali Mansoury
(74) Attorney, Agent, or Firm — McDermott Will & Emery LLP

(57) ABSTRACT

Exemplary embodiments provide a client in a network sending data packets to a server using multiple paths. The client may check if the server can receive packets sent at the backup ports of the client by including an option in a first packet sent to the server. The option included in the packet may provide a list of available backup ports that may be used by the client to communicate with the server. If the server supports the option, the server includes the option in an acknowledgment packet sent back to the client. The client and the server may create a mapping from the client's backup ports to the client's primary port. Thus, when the server receives a packet sent at a backup port, the server treats the packet as if the packet was sent at the primary port of the client.

18 Claims, 5 Drawing Sheets

TCP CONNECTION RESILIENCY IN MULTIPATH NETWORKS

BACKGROUND

In a conventional network, there may be multiple paths to transport data packets between a client and a server of the network. The network may be configured to split the traffic among these multiple paths. In a network that deploys Weighted Cost MultiPath (WCMP) routing, the traffic may be distributed among available paths based on a set of pre-determined ratios routing. If the pre-determined ratios are equal, the routing is Equal Cost MultiPath (ECMP) routing, where the traffic is distributed evenly among the available paths.

Conventionally, the path taken by a particular Transmission Control Protocol (TCP) packet to travel from the client to the server is determined using a set of five different values, called as five-tuple, that make up a Transmission Control Protocol/Internet Protocol (TCP/IP) connection. The five-tuple may include source IP address (e.g. "src ip"), destination IP address (e.g. "dest ip"), the protocol in use (e.g. "l3ptoto=tcp"), source port number (e.g. "src port") and destination port number (e.g. "dest port"). For example the five-tuple can be expressed as <src ip, dest ip, l3ptoto=tcp, src port, dest port>.

In conventional networks, the packet flow of a given TCP connection is carried over a single determined path within the network even when multiple alternate paths exist. During periods of congestion on the determined path, alternate paths cannot be exploited. Thus, when the determined path is congested, the data traffic on the determined path is delayed.

SUMMARY

Embodiments of the present invention may enable a client in a network to send data packets to a server using backup ports instead of, or in addition to, the primary communication port between the client and the server.

Various embodiments may provide a computer-implemented method comprising sending a synchronization packet to a server in a network. The method further includes identifying a set of backup ports as an option in the synchronization packet. The set of backup ports are indicated as allocated. An acknowledgement packet is received from the server, and it is determined whether the acknowledgement message indicates that the backup ports are supported. If the acknowledgement message indicates that the backup ports are supported, one or more data packets are sent using one or more of the set of backup ports. If the acknowledgement message does not indicate that the backup ports are supported, the set of backup ports are indicated as free and the one or more data packets are sent on a primary port.

In some embodiments, a computer-implemented method includes receiving a synchronization packet from a client in a network. The synchronization packet includes an option of a set of backup ports. The method includes determining that the set of backup ports is supported and sending an acknowledgement packet to the client. The acknowledgment packet includes the option. The method further comprises receiving a data packet from the client at one of the set of backup ports.

Exemplary embodiments may provide a computer-implemented method comprising sending a synchronization packet to a server in a network. The method includes identifying a set of backup ports as an option in the synchronization packet and indicating the set of backup ports as allocated. The method further includes receiving an acknowledgement packet from the server. The acknowledgement message indicates that the backup ports are supported by the server. One or more data packets are sent using one or more of the set of backup ports.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments enable a client in a network to send data packets to a server using alternative paths. For example, the client may use one or more backup ports instead of, or in addition to, a primary port used for communication with the server. In some embodiments, the client may send the data packets using the backup ports when the primary port is congested. In other embodiments, the client may send the data packets using the backup ports when a TCP timeout occurs at the primary port (e.g. a controller associated with the network terminates the connection at the primary port). Accordingly, even when a path between the client and the server is congested or down, the client may send the data packets in order by using the alternative paths.

According to various embodiments, the client may check if the server can receive packets sent at the backup ports. For example, the client may include an option in a first synchronization packet sent to the server. The option may provide a list of available backup ports that may be used by the client to communicate with the server. If the server does not support the option, the communication proceeds as in conventional communication networks.

If the server supports the option, the server includes the option in an acknowledgment packet sent back to the client. When the server indicates that the server can support one or more of the alternative backup ports as indicated in the option, the client and the server may communicate using the one or more of the backup ports. According to various embodiments, the client and the serve may create a mapping from the backup ports of the client to the primary port of the client. Thus, when the server receives a packet sent at one of the backup ports, the server treats the packet as if the packet was sent at the primary port of the client.

Figure 1A:
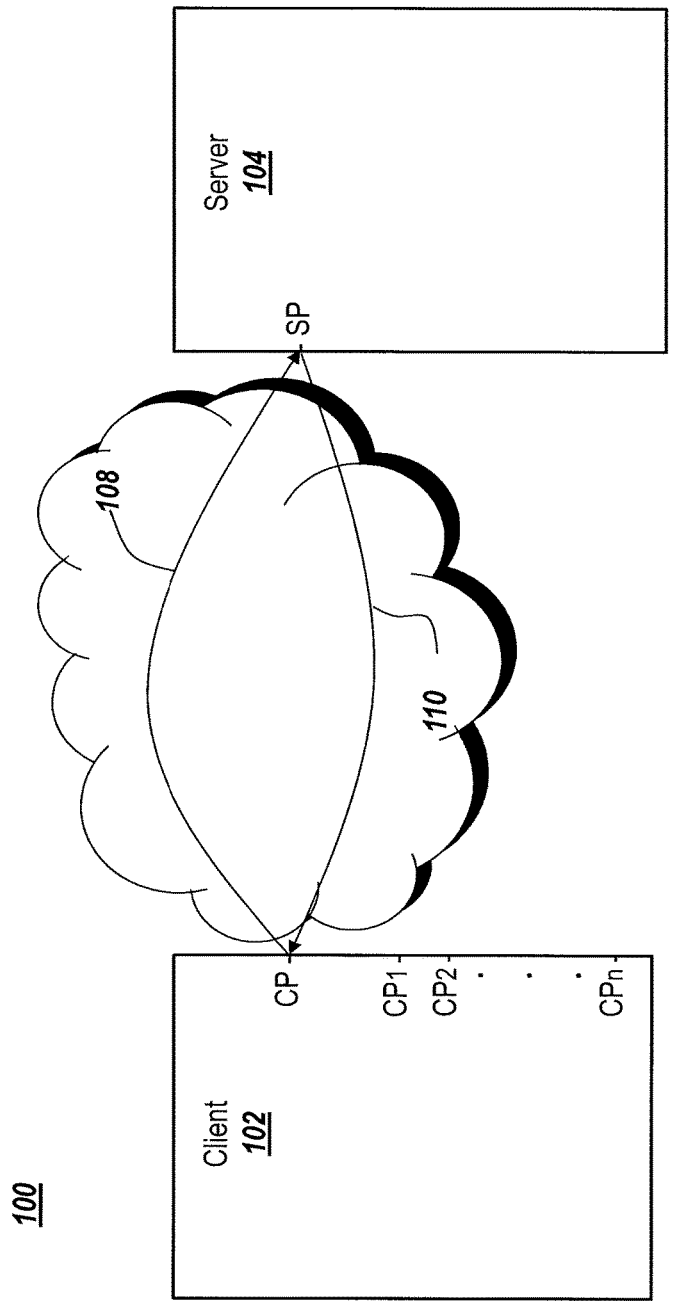
FIG. 1A depicts sending a data packet from a client to a server in a network using conventional routing techniques.

FIG. 1A illustrates an exemplary conventional communication network 100 where the client 102 and the server 104 exchange information, e.g. data packets. The client 102 and the server 104 may negotiate the parameters of the network port connections through a series of messages, e.g. TCP handshake, before transmitting data. The series of messages may include a TCP-SYN packet 108 sent by the client 102 at a primary communication port CP. The TCP-SYN packet 108 is the first packet sent across a TCP connection to synchronize the client 102 and the server 104. The TCP handshake messages may also include a SYN+ACK packet 110 sent by the server 104 at a server port SP. The SYN+ACK packet 110 is the acknowledgment message sent by the server 104 indicating that TCP-SYN packet 108 is received by the server 104.

The TCP-SYN packet 108 may include an option that provides a list of available backup ports that may be used by the client 102 to communicate with the server 104. As illustrated in FIG. 1A, if the server 104 does not support the option, the server replies with a SYN+ACK packet 110 that does not include the option. When the client 102 receives the SYN+ACK packet 110 without the option, the client 102 communicates with the server 104 at the primary port CP.

Figure 1B:
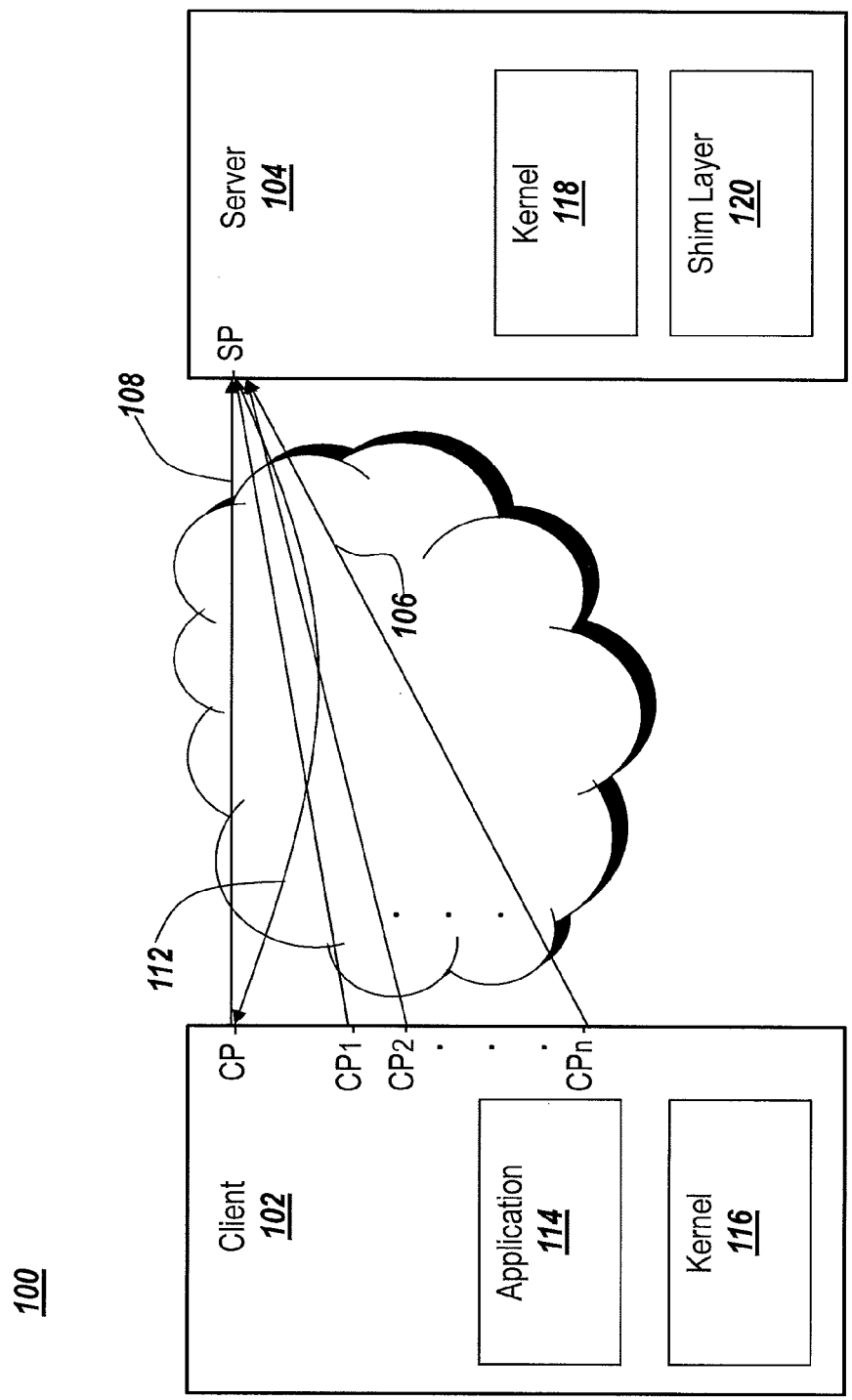
FIG. 1B depicts sending a data packet from a client to a server in a network using backup ports of the client according to various embodiments described herein.

According to various embodiments, if the server 104 supports the option, the server 104 includes the option in the SYN+ACK packet 112, as illustrated in FIG. 1B. When the client 102 receives the SYN+ACK packet 112 including the option, the client 102 communicates with the server 104 using one or more of the backup ports $CP_1, CP_2, \ldots CP_n$ in addition to, or instead of, the primary port CP. Accordingly, the client 102 may send data packets to the server 104 using alternative paths 106 connecting one or more of the backup ports $CP_1, CP_2, \ldots CP_n$ to the server port SP.

For example, when the client 102 initiates a connection to server port SP of the server 104, the client 102 may use the primary port CP on which the client 102 does the TCP handshake. The client 102 may also send a set of back up ports $\{CP_1, CP_2, \ldots, CP_n\}$ as an option. For example, the client 102 may send the option in the header in the TCP-SYN packet 108. If the server 104 supports the option, the server includes the option in the SYN+ACK packet 112. Thus, it is determined that both the client 102 and the server 104 honor the option. The kernel 116 of the client 102 and the kernel 118 of the server 104 may create a mapping from the backup ports $CP_1, CP_2, \ldots, CP_n$ of the client 102 to the primary port CP of the client 104. For example, the mapping may include the following five-tuples that all point to the same server port SP:

<client_ip, server_ip, TCP, src_port=CP, dest_port=SP>
<client_ip, server_ip, TCP, src_port=$CP_1$, dest_port=SP>
<client_ip, server_ip, TCP, src_port=$CP_2$, dest_port=SP>
. . .
<client_ip, server_ip, TCP, src_port=$CP_n$, dest_port=SP>

When the server 104 receives a packet on any of the backup ports $CP_1, CP_2, \ldots CP_n$ as the source port, the server 104 treats the packet as if the packet was sent at the primary port CP. The translation among the source ports may be done in a shim layer 120 of the server 104 before the packet is passed to the kernel 118. The shim layer 120 may remap the source port $CP_n$ of the received packet to the primary port CP of the client 102 using the generated mapping.

According to various embodiments, the client 102 may allow an application 114 running on the client 102 to determine when to use the backup ports $CP_1, CP_2, \ldots CP_n$. For example, when there is a delay in response on the primary port CP, the application 114 may request the kernel 116 to send the packets at the backup ports $CP_1, CP_2, \ldots CP_n$ in lieu of, or in addition to, the primary port CP. In some embodiments, the kernel 116 may choose to send the packets at one or more of the backup ports $CP_1, CP_2, \ldots CP_n$ based on the round-trip time (RTT) and/or the congestion level of the primary port CP.

In some embodiments, the backup ports $CP_1, CP_2, \ldots CP_n$ may be serialized ports. In this case, a hashing mechanism may be used to determine which backup ports $CP_1, CP_2, \ldots CP_n$ of the client 102 can be used to transmit the data packets. The network connecting the client 102 and the server 104 may have a plurality of network devices such as switches, routers, etc. that use ECMP/WCMP to forward the data packets. Thus, each network device may have a plurality of paths to reach the destination. In some embodiments, hashing may be used to select one of the plurality of paths for forwarding the data packet. If the hashing algorithm used by the network devices is known to the client 102, the client 102 may select a backup port $CP_1, CP_2, \ldots CP_n$ to send the packet on. Therefore, the packet may take a different path than the packet would have taken absent hashing.

The hashing discussed above is an exemplary control mechanism that may be used to select one or more of the backup ports $CP_1, CP_2, \ldots CP_n$. Various embodiments may use alternative control mechanisms such as a random selection mechanism or a round-robin selection mechanism to determine which backup ports $CP_1, CP_2, \ldots CP_n$ of the client 102 can be used to transmit the data packets.

In various embodiments, the backup ports $CP_1, CP_2, \ldots CP_n$ of the client 102 may be used for sending replicated application payload packets for pushing highly urgent data through the network. In such embodiments, the kernel 116 of the client 102 is programmed such that the kernel 116 does not interpret repeated acknowledgement packets as a sign of congestion on the communication channels.

Figure 2:
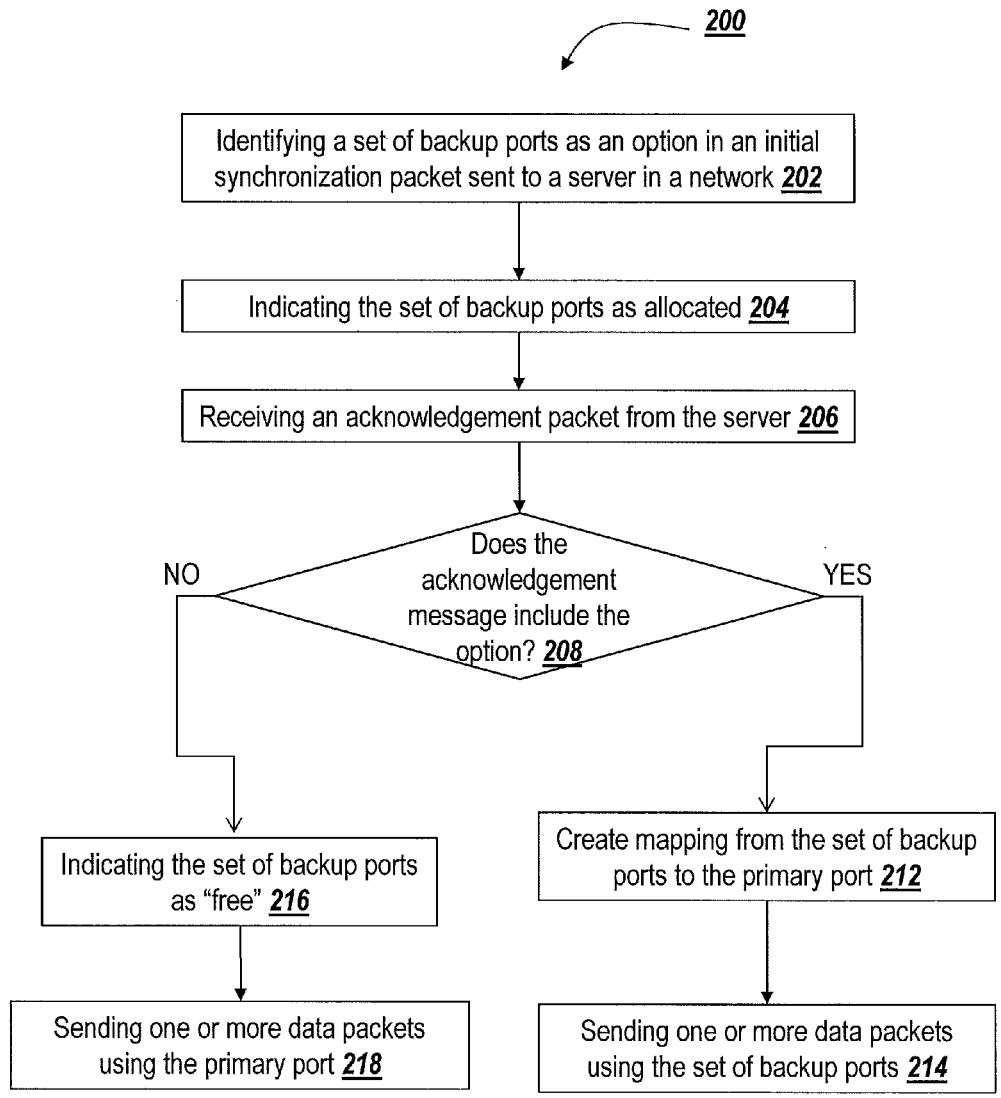
FIG. 2 is a flowchart describing steps taken by a client to send data packets to a server in a network in accordance with an exemplary embodiment.

FIG. 2 illustrates a flowchart 200 of steps taken by a client to communicate with a server in accordance with an exemplary embodiment. At step 202, the client identifies a set of backup ports that can be used to communicate with the server. The set of backup ports may be included as an option in an initial synchronization packet sent from the client to the server. While waiting for a reply from the server, the client may indicate that the set of backup ports are allocated (step 204). The client may receive an acknowledgement packet from the server in response to the initial synchronization packet (step 206). The client may determine whether the acknowledgement packet includes the option that was included in the initial synchronization packet (step 208). If it is determined that the acknowledgement packet includes the option (YES to step 206), the client generates a mapping from the set of backup ports to a primary port of the client (step 212). At step 214, the client may send the data packets on the set of backup ports instead of, or in addition to, the primary port of the client.

On the other hand, if it is determined that the acknowledgement packet does not include the option (NO to step 206), the client may release the set of backup ports by indicating that the set of backup ports are free (step 216). At step 218, the client may send the data packets using the primary port similar to a conventional communication network.

Figure 3:
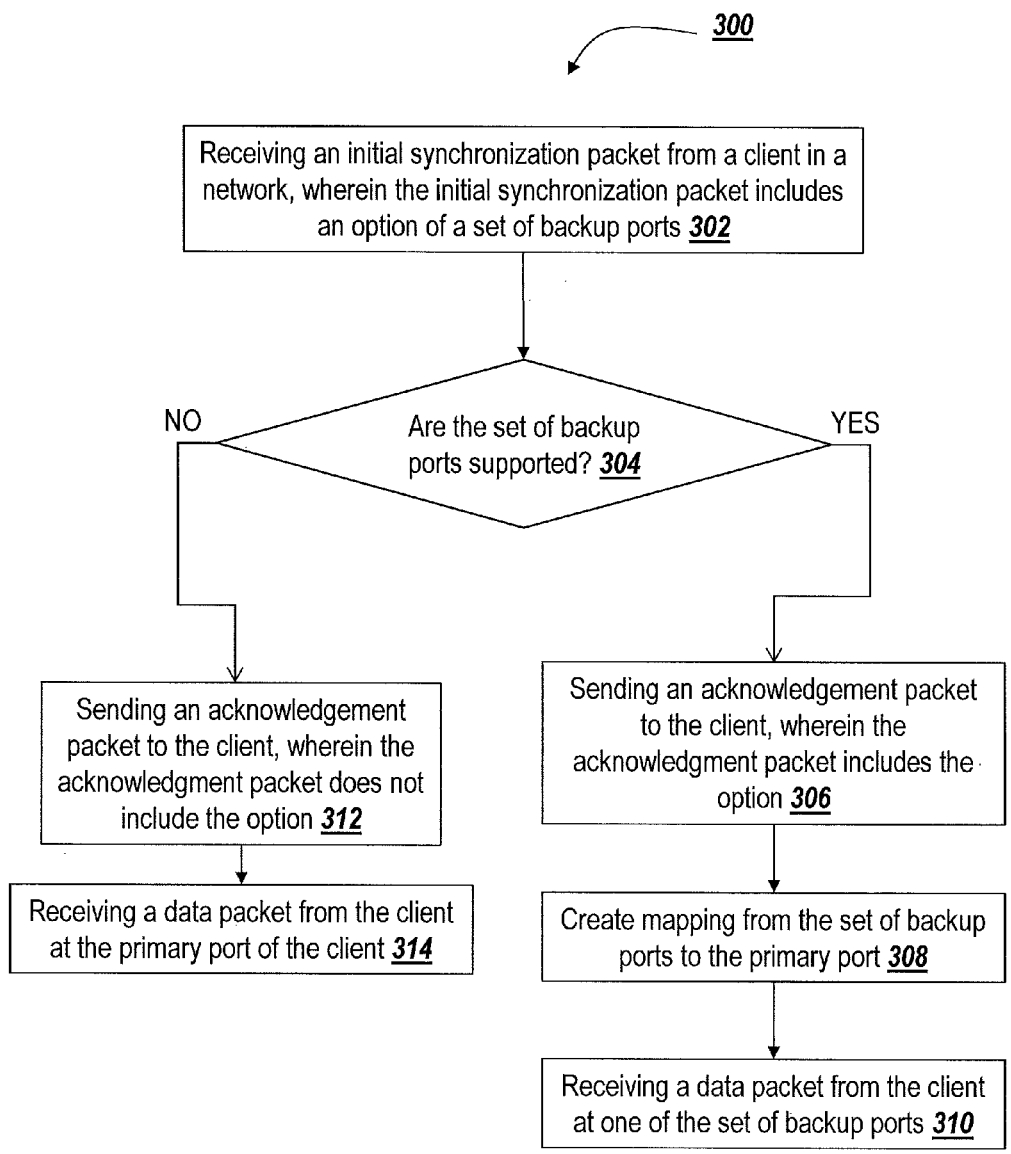
FIG. 3 is a flowchart describing steps taken by a server to receive data packets from a client in a network in accordance with an exemplary embodiment.

FIG. 3 illustrates a flowchart 300 of steps taken by a server to communicate with a client in accordance with an exemplary embodiment. At step 302, the server receives an initial synchronization packet from the client. The initial synchronization packet may include an option listing one or more backup ports of the client. For example, the initial synchronization packet may be a TCP-SYN packet the option may be included in the header of the TCP-SYN packet. At step 304, the server may determine whether the option, i.e. the set of backup ports, is supported. If the option is supported (YES to step 304), the server sends an acknowledgement packet to the client that includes the option (step 306). The server generates a mapping from the set of backup ports to the primary port of the client (step 308). The server may receive data packets sent from the client at the one or more of the backup ports (step 310). Using the mapping, the server may treat the received data packets as if the data packets were sent on the primary port of the client.

On the other hand, if the server determines that the option is not supported, (NO to step 304), the server sends the acknowledgement packet without including the option in the packet (step 312). At step 314, the server receives the data packets transmitted at the primary port of the client similar to a conventional communication network.

One or more of the above-described acts may be encoded as computer-executable instructions executable by processing logic. The computer-executable instructions may be stored on one or more non-transitory computer readable media. One or more of the above described acts may be performed in a suitably-programmed electronic device.

Figure 4:
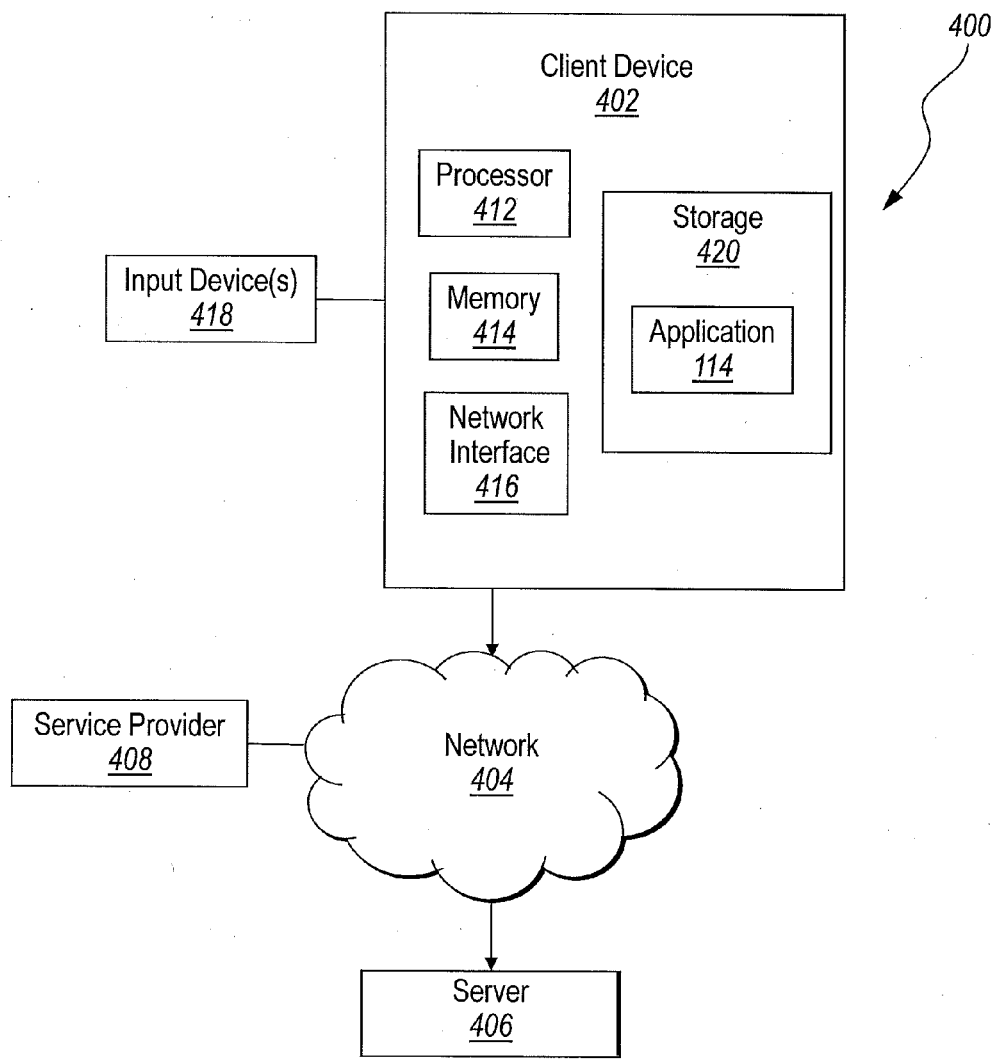
FIG. 4 depicts an exemplary computing device suitable for use with exemplary embodiments described herein.

FIG. 4 illustrates a communication system 400 for conveying a data packet from a client device to a specific destination according to the teachings of the present invention. The illustrated system 400 can include any conventional arrangement of networking components, and according to one embodiment, can include a client device 402 that is coupled to and otherwise communicates with an overall network 404. The network 404 in turn is coupled to a server 406. The embodiment of FIG. 4 is exemplary, and other embodiments can include more devices, fewer devices, or devices in arrangements that differ from the arrangement of FIG. 4.

The client device 402 can be any suitable electronic device and can take many forms, including but not limited to a computer, workstation, server, network computer, quantum computer, optical computer, Internet appliance, mobile device, a pager, a tablet computer, a smart sensor, application specific processing device, and the like. The client device 402 as illustrated herein is merely illustrative and may take other forms.

The client device 402 may also include selected components for generating and forwarding data packets. The components may be implemented using hardware based logic, software based logic and/or logic that is a combination of hardware and software based logic (e.g., hybrid logic). The client device 402 may include a processor 412 that can include logic that can interpret, execute, and/or otherwise process information contained in, for example, a memory element 414. The information may include computer-executable instructions and/or data that may be implemented by or in one or more embodiments of the present invention. The processor 412 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor 402 may include a single core or multiple cores. Moreover, the processor 402 may include a system-on-chip (SoC) or system-in-package (SiP) design.

The client device 402 may also include one or more tangible non-transitory computer-readable storage media for storing one or more computer-executable instructions or software that may be implemented by or in one or more embodiments of the present invention. The non-transitory computer-readable storage media may be, for example, a memory 414 or storage element. The memory 414 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, memristors, or other types of RAM devices.

The client device 402 may also be a virtual machine (VM) for executing instructions loaded in the memory 414. The virtual machine may be provided to handle a process running on multiple processors so that the process may appear to be using only one computing resource rather than multiple computing resources. Virtualization may be employed in the client device 402 so that infrastructure and resources in the client device 402 may be shared dynamically. Multiple VMs may be resident on a single client device.

The client device 402 may also include a network interface 416 so as to be able to interface to the network 404. The network 404 can be a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 416 may include a built-in network adapter, network interface card, personal computer memory card international association (PCMCIA) network card, card bus network adapter, wireless network adapter, universal serial bus (USB) network adapter, modem or any other device suitable for interfacing the client device to any type of network 404 capable of communication and performing the operations described herein.

The client device 402 may also be coupled to one or more input devices 418, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. The client device 402 may also include other suitable I/O peripherals.

A storage device 420 may also be associated with the client device 402 or with any other system component. The storage device 420 may be accessible to the processor via an I/O bus. The information may be executed, interpreted, manipulated, and/or otherwise processed by the processor 412. The term storage device 420 as used herein for example with the client device 402 or any other system component may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device 420. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the present application.

The storage device 420 may further store application(s) 114, and the client device 402 can be running an operating system (OS). Examples of suitable operating systems may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 420 may further include rules which describe how messages should be forwarded over a communications system. The rules may be used to forward messages or information received at the client device 402. Accordingly, the client device 402 may serve as a forwarding device, switch, or router.

The storage device 420 may include logic for implementing one or more selected communication protocols. The communication protocol may be a protocol which provides an interface for accessing and modifying the functionality of the forwarding plane of the client device.

One or more embodiments of the present invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

FIG. 4 also illustrates the network 404 suitable for implementing one or more embodiments of the present invention. The network 404 is merely exemplary, and other embodiments can include more devices, fewer devices, or devices in arrangements that differ from the arrangement of FIG. 4.

The illustrated network 404 may transport data from a source (e.g., client device 402) to a destination (e.g., server 406). The network 404 may employ any selected combination or arrangements of network devices, such as routers, switches, firewalls, and/or servers and connections (e.g., links) (not shown) to transport data. Data may refer to any type of machine-readable information having substantially any format that may be adapted for use in one or more networks and/or with one or more devices described herein. Data may include digital information or analog information. The data may be packetized and/or non-packetized, although the present invention assumes the use of packetized data.

The network 404 may be a hardwired network using wired conductors and/or optical fibers and/or may be a wireless network using free-space optical, radio frequency (RF), and/or acoustic transmission paths. In one implementation, the network 404 may be a substantially open public network, such as the Internet. In another implementation, the network 404 may be a more restricted network, such as a corporate virtual network. The network 404 may include the Internet, intranet, Local Area Network (LAN), Wide Area Network (WAN), Metropolitan Area Network (MAN), wireless network (e.g., using IEEE 802.11), or other type of network. The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The system 400 can also include a service provider 408 that makes a service available to another component of the system. For example, the service provider 408 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The system 400 also includes the server 406. The server 406 may include a device that receives information over the network 404. For example, the server 406 may be a device that receives data from the client device 402. Those of ordinary skill will readily recognize that the system 400 may employ any suitable number of servers.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A computer-implemented method comprising:
 sending a synchronization packet to a server in a network, wherein the synchronization packet identifies a primary source port and a set of backup source ports different from the primary source port;

receiving an acknowledgement message from the server responsive to the synchronization packet;

determining, from the acknowledgement message, whether the server supports receiving packets sent from the backup source ports as though they were sent from the primary source port;

sending at least one of a plurality of data packets from the primary source port; and when the acknowledgement message indicates that use of the backup source ports is supported, sending one or more of the plurality of data packets using one or more backup source ports in the set of backup source ports; and further comprising: generating a mapping from the set of backup source ports to the primary source port if the acknowledgement message indicates that the server supports receiving the packets sent from the backup source ports as though they were sent from the primary source port.

2. The method of claim 1, further comprising:

sending a plurality of replicated data packets using both the primary source port and at least one backup source port in the set of backup source ports.

3. The method of claim 1, wherein the acknowledgement message indicates that the backup source ports are supported by including, in the acknowledgement message, the set of backup source ports supported.

4. The method of claim 1, further comprising:

selecting the set of backup source ports using a hashing mechanism.

5. The method of claim 1, further comprising:

selecting the set of backup source ports using a random selection mechanism or a round-robin mechanism.

6. The method of claim 1, further comprising sending at least one data packet using a first backup source port in the set of backup source ports responsive to a delay in a response to one or more packets sent using the primary source port.

7. The method of claim 1, further comprising:

sending, using a first backup source port in the set of backup source ports, a replica of the at least one of the plurality of data packets sent from the primary source port.

8. A computer-implemented method, comprising:

receiving a synchronization packet sent from a client to a server in a network, wherein the synchronization packet identifies a primary source port and a set of backup source ports different from the primary source port;

determining that the server supports receiving packets sent from the set of backup source ports as though they were sent from the primary source port;

sending an acknowledgement packet to the client, wherein the acknowledgment packet indicates support for receiving the packets sent from the set of backup source ports as though they were sent from the primary source port: and receiving a data packet sent to the server from the client using a first backup source port from the set of backup source ports; and further comprising: generating a mapping from the set of backup source ports to the primary source port if the acknowledgement message indicates that the server supports receiving the packets sent from the backup source ports as though they were sent from the primary source port.

9. The method of claim 8, further comprising:

translating, for the received data packet, the first backup source port into the primary source port of the client at a shim layer of the network.

10. A non-transitory computer-readable storage media storing computer-executable instructions that, when executed by a computer processor, cause the computer processor to:

send a synchronization packet to a server in a network, wherein the synchronization packet identifies a primary source port and a set of backup source ports different from the primary source port;

determine, from an acknowledgement message received from the server, whether the server supports receiving packets sent from the backup source ports as though they were sent from the primary source port;

send at least one of a plurality of data packets from the primary source port; and when the acknowledgement message indicates that use of the backup source ports is supported, send one or more of the plurality of data packets using one or more backup source ports in the set of backup source ports; and further comprising: generating a mapping from the set of backup source ports to the primary source port if the acknowledgement message indicates that the server supports receiving the packets sent from the backup source ports as though they were sent from the primary source port.

11. The non-transitory computer-readable storage media of claim 10, the media further storing computer-executable instructions that, when executed by the computer processor, cause the computer processor to:

send a plurality of replicated data packets using both the primary source port and at least one backup source port in the set of backup source ports.

12. The non-transitory computer-readable storage media of claim 10, the media further storing computer-executable instructions that, when executed by the computer processor, cause the computer processor to:

send, using a first backup source port in the set of backup source ports, a replica of the at least one of the plurality of data packets sent from the primary source port.

13. The non-transitory computer-readable storage media of claim 10, wherein the acknowledgement message indicates that the backup source ports are supported by including, in the acknowledgement message, the set of backup source ports supported.

14. The non-transitory computer-readable storage media of claim 10, the media further storing computer-executable instructions that, when executed by the computer processor, cause the computer processor to:

select the set of backup source ports using one of: a hashing mechanism, a random selection mechanism, or a round-robin mechanism.

15. The non-transitory computer-readable storage media of claim 10, the media further storing computer-executable instructions that, when executed by the computer processor, cause the computer processor to:

send at least one data packet using a first backup source port in the set of backup source ports responsive to a delay in a response to one or more packets sent using the primary source port.

16. A system, comprising:

a server configured to receive network packets via a network, the server further configured to:

receive, from a client via the network, a synchronization packet that identifies a primary source port and a set of backup source ports different from the primary source port;

determine that the server supports receiving packets sent from the set of backup source ports as though they were sent from the primary source port;

generate a mapping of the set of backup source ports to the primary source port of the client;

send an acknowledgement packet to the client, wherein the acknowledgment packet indicates support for receiving the packets sent from the set of backup source ports as though they were sent from the primary source port; and receive a data packet sent to the server from the client using a first backup source port from the set of backup source ports; and further comprising: generating a mapping from the set of backup source ports to the primary source port if the acknowledgement message indicates that the server supports receiving the packets sent from the backup source ports as though they were sent from the primary source port.

17. The system of claim 16, further comprising a network shim, the network shim configured to:

translate, for the received data packet, the first backup source port into the primary source port of the client based on the mapping.

18. The system of claim 16, the server further configured to include, in the acknowledgment packet, the set of backup source ports supported.

* * * * *